United States Patent [19]

Hughes

[11] 4,092,014
[45] May 30, 1978

[54] FEED MIXER

[75] Inventor: William Felix Hughes, Belmont, Australia

[73] Assignee: Hughes Steel Products Pty. Ltd., Belmont, Australia

[21] Appl. No.: 732,102

[22] Filed: Oct. 13, 1976

[51] Int. Cl.² .............................................. B01F 7/00
[52] U.S. Cl. ................... 366/156; 366/186; 366/287; 366/323; 366/603
[58] Field of Search .................. 259/5, 21, 24, 26, 42, 259/44, 97, DIG. 31; 214/521, 522, 17 DA

[56] References Cited

U.S. PATENT DOCUMENTS

| | | | |
|---|---|---|---|
| 2,551,216 | 5/1951 | Martin | 214/17 DA |
| 3,084,814 | 4/1963 | Schoefer | 214/17 DA |
| 3,133,727 | 5/1964 | Luscombe | 259/97 X |
| 3,667,734 | 6/1972 | Skromme | 259/44 |

FOREIGN PATENT DOCUMENTS 385,398   3/1965   Switzerland ................... 214/17 DA Primary Examiner—Edward J. McCarthy
Attorney, Agent, or Firm—Haseltine, Lake & Waters

[57] ABSTRACT

A mixer with a substantially conical mixing chamber supported vertically with its apex lowermost. A tapered auger is situated in the mixing chamber and mixer drive is provided at the base of the mixing chamber. The narrowmost end of the tapered auger is connected to the drive such that the auger rotates around its own axis and its upper end rolls around the upper periphery of the mixing chamber.

The upper end of the auger has a wheel to allow the auger to freely roll around the upper periphery of the mixing chamber and to insure that the auger does not contact the walls of the mixing chamber. The wheel is held in contact with the upper periphery of the mixing chamber under the action of the weight of the auger.

8 Claims, 4 Drawing Figures

FEED MIXER

This invention relates to a mixer for mixing grain, hay, feed concentrates and other additives.

Mixing is necessary when more than one ingredient is contained in a feed ration. Efficient mixing becomes essential when the proper ration for each beast or bird is to be fed. Each beast needs its proper ration to achieve the weight gain or milk production required. Let us assume that a number of similar beasts (e.g. a line of steers of similar type and age) are being fed. Each beast will need a similar ration of feed to achieve a similar weight gain to the remainder. Without mixing, feed containing several ingredients will have pockets or layers of material. Some beasts will feed on hay, others on grain. Those eating hay will convert less efficiently than those on grain and those on grain run the risk of eating lethal feed. When feed is properly mixed and each beast given equal opportunity, those that are not performing in weight gain can be checked and culled for other seasons. Mixers in use heretofore have been of the cylinder or cyclone type and have the disadvantage that "dead" corners exist in the shape of the unit and fine dust collects in these corners, thereby restricting the mixing action. Similarly in cyclone mixers fine particles of the feed was carried out by the air and therefore resulting in a loss of feed besides being a nuisance to workers in the vicinity. It is the object of this invention to eliminate dead corners and the like and at the same time produce a satisfactory mix.

In one form the invention resides in a mixer comprising a substantially conical mixing chamber supported vertically with its apex lowermost, a means for feeding material into the mixing chamber, a tapered auger situated in the mixing chamber, drive means provided at the base of the mixing chamber, the narrowmost end of the tapered auger connected to the drive means such that the auger rotates around it own axis and its upper end rolls around the upper periphery of the mixing chamber, the upper end of the tapered auger being provided with a wheel or roller to allow the tapered auger to freely roll around the upper periphery of the mixing chamber and ensure that the tapered auger does not contact the walls of the mixing chamber, the wheel or roller being held in contact with the upper periphery of the mixing chamber under the action of the weight of the tapered auger and means of discharging the material from the mixing chamber.

In another form the invention resides in a mixer comprising a substantially conical mixing chamber, supported vertically with its apex lowermost, a first auger for feeding material into the mixing chamber, feed inlet means for delivering material to the first auger, a tapered auger situated in the mixing chamber, drive means provided at the base of the mixing chamber, linking the first auger to the tapered auger, the narromost end of the tapered auger connected to the drive means such that the auger rotates around its own axis and its upper end rolls around the upper periphery of the mixing chamber, the upper end of the tapered auger being provided with a wheel or roller to allow the tapered auger to freely roll around the upper periphery of the mixing chamber and ensure that the tapered auger does not contact the walls of the mixing chamber, the wheel or roller being held in contact with the upper periphery of the mixing chamber under the action of the weight of the tapered auger and means for discharging the material from the mixing chamber.

Preferably the upper free end of the tapered auger has a wheel or roller positioned thereon to allow the auger to freely roll around the upper periphery of the mixing chamber and ensure that the auger does not contact the walls of the mixing chamber.

The invention will be better understood by reference to the following description of one specific embodiment as shown in the accompanying drawings wherein.

Figure 1:
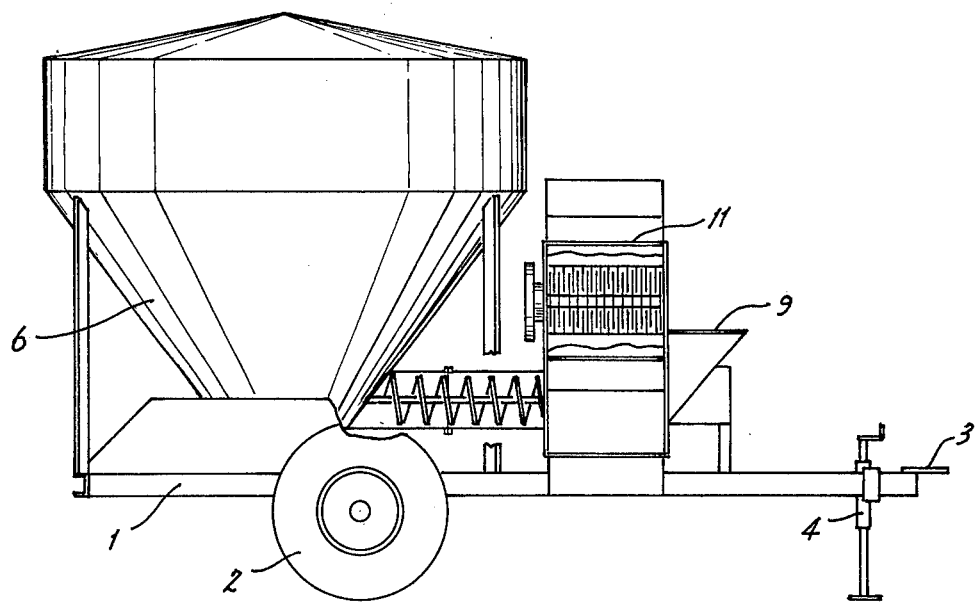
FIG. 1 is a side elevation of the mixer.
Figure 2:
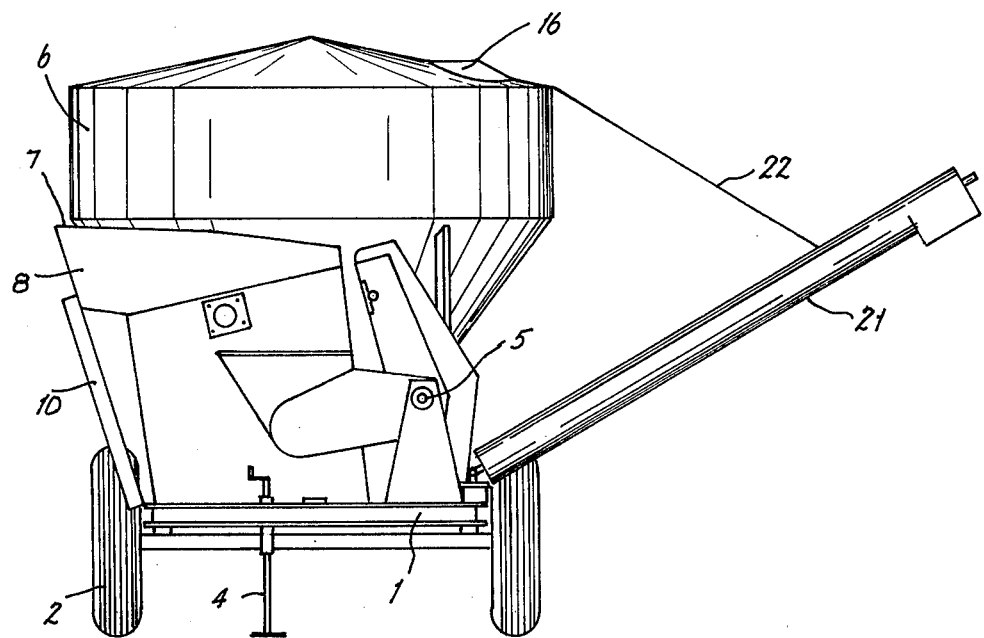
FIG. 2 is a front elevation.
Figure 3:
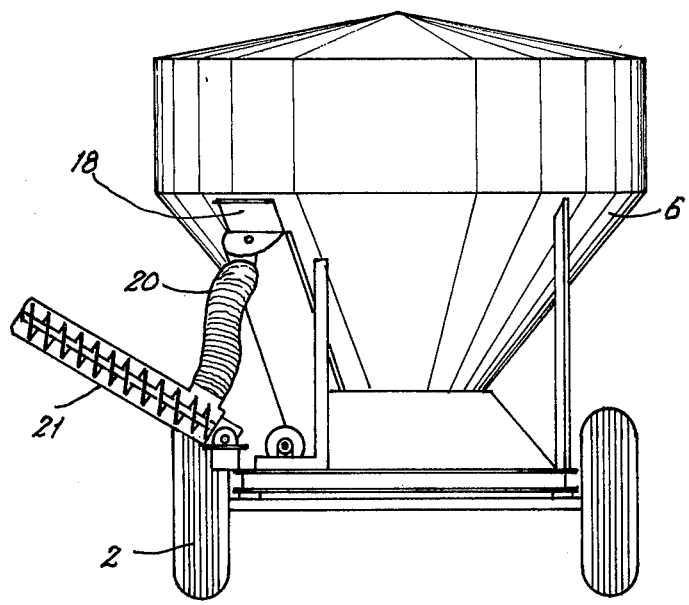
FIG. 3 is an elevation showing the discharge means.
Figure 4:
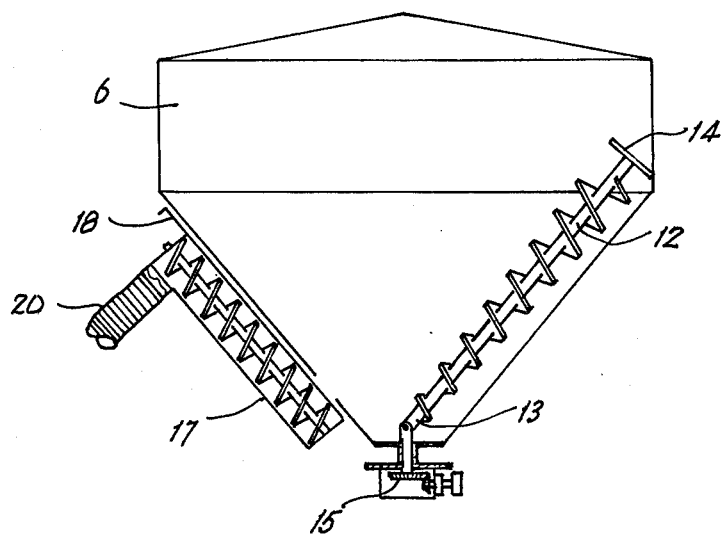
FIG. 4 is a fragmentary view showing the tapered auger in the mixing chamber.

In this embodiment the components of the mixer are mounted on a frame 1 supported on wheels 2. The forward end of the frame is provided with means 3 for coupling it to a towing vehicle and a jack 4 for levelling purposes. A drive shaft 5 is provided for a power take off from the towing vehicle to power the augers and hammer mill of the mixer. Material is transferred into a mixing chamber 6 by means of a first auger which is powered through a belt and pulley drive to a pulley on the drive shaft 5. Material to be transferred into the mixing chamber 6 is delivered to the first auger by various means. Grain and similar material is fed through a substantially vertical first inlet 7, hay and like material that requires breaking up is fed through a substantially horizontal second inlet 8 and feed concentrates and other additives are fed directly into the auger through inlet 9. The horizontal inlet 8 is closed by a flap door and is provided with a foldable delivery chute 10. The chute is pivoted to allow easy storage and is held in its stored position by a supporting frame 11. When in use the chute is erected into a substantially horizontal position and supported by the frame 11. Hay and similar material passes into the horizontal inlet 8 and is broken up into a fine mass by rotating blades in a hammer mill. Any other suitable means may be used to break up the material. The material from the feed inlets is then transferred into the mixing chamber 6 by means of the first auger. The substantially conical mixing chamber 6 is mounted in a vertical position with its apex lowermost. A tapered auger 12 is fitted at its narrowmost end to a universal 13 at the apex of the conical chamber and mounted for rotation about its own axis and revolution around the upper periphery of the mixing chamber. A wheel or roller 14 is mounted on the free end of the tapered auger 12 so that the auger can freely roll around the upper periphery of the mixing chamber and to ensure that the screw of the auger does not contact the walls of the mixing chamber. Because of its tapered shape, the auger 12 has a high centre of gravity. This ensures that the wheel or roller 14 remains in contact with the upper periphery of the mixing chamber under the action of the weight of the tapered auger, even when feed is being mixed, and so eliminates the need to provide means to hold the wheel or roller against the upper periphery of the mixing chamber. The use of the wheel or roller 14 also dispenses with the need of having a radial crank arm connected to the upper end of the tapered auger 12 to cause the auger 12 to revolve within the mixing chamber. The tapered auger 12 is powered through the universal 13 and gearing 15 from the drive shaft of the first auger. The rotation and revolution of the tapered auger mixes the feed and ensures that no fine particles of feed collect in any one section. The top of the mixing chamber is closed and provided with an access door 16.

Means to discharge the contents of the mixing chamber may comprise a discharge auger provided within a casing 17, which extends up the side of the mixing chamber. Drive for this auger is taken from the drive of the mixing auger by means of a dog clutch arrangement, which is engaged by a lever. A flap or sliding door 18 closes the outlet from the mixing chamber into the discharge auger casing 17. When the flap is raised the material can flow from the mixing chamber into the discharge casing and so be carried to the discharge auger outlet. The outlet end of the discharge auger has a flexible pipe 20 attached to direct the discharging contents into a side discharge auger. This side discharge auger is enclosed in a casing 21 and powered from the drive shaft 5. The lower end of this side discharge auger is pivotally mounted to the frame for rotation about a substantially horizontal and substantially vertical axis for convenient positioning. A hand operated winch is mounted on the discharge auger casing 21. One end of a wire 22 is wound onto the winch, the other end being fixed to the upper portion of the mixing chamber. The side discharge auger can then be raised or lowered by operation of the winch and pivoted to the desired position for discharging of the feed mix.

In use, grain is fed into the vertical feed inlet, hay is fed into the horizontal inlet and through the hammer mill, and feed concentrates and other additives are fed directly to the first auger. The feed material is then transferred into the mixing chamber where it is raised by the rotating auger and allowed to spill back towards the base of the chamber. The rotating and revolving motion of the tapered auger ensures that the materials are thoroughly mixed. The feed can then be discharged as required.

I claim:

1. A mixer comprising a substantially conical mixing chamber supported vertically with its apex lowermost, means for feeding material into the mixing chamber, a tapered auger situated in the mixing chamber, drive means provided at the base of the mixing chamber, the narrowmost end of the tapered auger connected to the drive means such that the auger rotates around its own axis and its upper end rolls around the upper periphery of the mixing chamber, the upper end of the tapered auger being provided with a wheel or roller to allow the tapered auger to freely roll around the upper periphery of the mixing chamber and ensure that the tapered auger does not contact the walls of the mixing chamber, the wheel or roller being held in contact with the upper periphery of the mixing chamber under the action of the weight of the tapered auger, and means for discharging material from the mixing chamber.

2. A mixer comprising a substantially conical mixing chamber, supported vertically with its apex lowermost, a first auger for feeding material into the mixing chamber, feed inlet means for delivering material to the first auger, a tapered auger situated in the mixing chamber, drive means provided at the base of the mixing chamber, linking the first auger to the tapered auger, the narrowmost end of the tapered auger connected to the drive means such that the auger rotates around its own axis and its upper end rolls around the upper periphery of the mixing chamber, the upper end of the tapered auger being provided with a wheel or roller to allow the tapered auger to freely roll around the upper periphery of the mixing chamber and ensure that the tapered auger does not contact the walls of the mixing chamber, the wheel or roller being held in contact with the upper periphery of the mixing chamber under the action of the weight of the tapered auger and means for discharging material from the mixing chamber.

3. A mixer comprising a substantially conical mixing chamber, supported vertically with its apex lowermost, a first auger for feeding material into the mixing chamber, feed inlet means for delivering materials to the first auger, a tapered auger situated in the mixing chamber, drive means provided at the base of the mixing chamber linking the first auger to the tapered auger, the narrowmost end of the tapered auger connected to the drive means such that the auger rotates around its own axis and its upper end rolls around the upper periphery of the mixing chamber, the upper end of the tapered auger being provided with a wheel or roller to allow the tapered auger to freely roll around the upper periphery of the mixing chamber and ensure that the tapered auger does not contact the walls of the mixing chamber, the wheel or roller being held in contact with the upper periphery of the mixing chamber under the action of the weight of the tapered auger, a second auger enclosed in a casing extending up the side of the mixing chamber to convey the feed mix from the mixing chamber to a side discharge auger, a sliding flap door to allow outlet of the feed material from the mixing chamber to the third auger, and a side discharge auger for transferring the material from the third auger to a discharging point.

4. A mixer as claimed in claim 3 wherein: the feed means comprising a first inlet for grain or like material, a second inlet for hay or similar material and a third inlet for feeding feed concentrates and other additives to the first auger.

5. A mixer as claimed in claim 4 wherein a hammer mill crusher is provided in the second inlet to break up hay and like material.

6. A mixer as claimed in claim 5 wherein: the second inlet is provided with a foldable delivery chute, the chute when erected being supported in a substantially horizontal position by a supporting frame, and when folded for storage being held in position by the supporting frame.

7. A mixer as claimed in claim 3 wherein: the side discharge auger is pivotally mounted to the frame for rotation about a substantially horizontal axis and a substantially vertical axis so that the side discharge auger can be rotated and elevated to the required position for discharge.

8. A mixer as claimed in claim 4, wherein: a roller mill crusher is provided in the second inlet to break up hay and like material.

* * * * *